(12) United States Patent
Friedlander et al.

(10) Patent No.: US 9,106,543 B2
(45) Date of Patent: Aug. 11, 2015

(54) SIGNAL OVERLOAD MANAGEMENT IN MAJOR EVENTS AND DISASTERS

(71) Applicant: International Business Machines Corporation, Armonk, NY (US)

(72) Inventors: Robert R. Friedlander, Southbury, CT (US); James R. Kraemer, Santa Fe, NM (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 13/746,611

(22) Filed: Jan. 22, 2013

(65) Prior Publication Data

US 2014/0207936 A1    Jul. 24, 2014

(51) Int. Cl.
*G06F 15/16* (2006.01)
*H04L 12/24* (2006.01)
*H04L 29/06* (2006.01)
*H04L 12/26* (2006.01)
*G06F 12/00* (2006.01)

(52) U.S. Cl.
CPC ............ *H04L 41/0896* (2013.01); *H04L 29/06* (2013.01); *H04L 43/0882* (2013.01); *H04L 41/06* (2013.01)

(58) Field of Classification Search
USPC .......................... 709/203, 223–229, 234–235
See application file for complete search history.

(56) References Cited

U.S. PATENT DOCUMENTS

| 8,073,903 | B2 | 12/2011 | Wood et al. |
| 8,769,023 | B2* | 7/2014 | Lau ............................... 709/206 |
| 2007/0238445 | A1 | 10/2007 | Nagasawa et al. |
| 2008/0081607 | A1* | 4/2008 | Tangorra et al. ............. 455/425 |
| 2008/0086219 | A1 | 4/2008 | Evans et al. |
| 2009/0143046 | A1* | 6/2009 | Smith ......................... 455/404.1 |
| 2011/0159837 | A1 | 6/2011 | Daly et al. |
| 2013/0159094 | A1* | 6/2013 | McClelland et al. ...... 705/14.49 |

FOREIGN PATENT DOCUMENTS

| JP | 05191340 A | 7/1993 |
| JP | 2004104375 A | 4/2004 |
| JP | 2007133642 A | 5/2007 |

* cited by examiner

*Primary Examiner* — Zarni Maung
(74) *Attorney, Agent, or Firm* — Brown & Michaels, PC; John R. Pivnichny

(57) ABSTRACT

A method, computer program product and system for managing an overload of signals on a network due to usage by a large number of users on the network during an event, comprising: detecting a cluster of communication on the network, determining a physical location of a centroid of the cluster of the communication on the network, associating the physical location of the centroid to be the approximate physical location of the event; reviewing information within cluster of communication being sent through the network regarding the event; categorizing the event based on a predetermined set of rules; determining bandwidth limitations of the network for users within a determined proximity to the physical location of the event; determining the resources necessary to respond to and resolve the event; and allocating bandwidth of the network based upon the resources and the proximity of users to the physical location of the event.

24 Claims, 4 Drawing Sheets

SIGNAL OVERLOAD MANAGEMENT IN MAJOR EVENTS AND DISASTERS

BACKGROUND

The present invention relates to management of signals, especially an overload of bandwidth usage on a network, and more specifically to managing an overload of signals on a communications network due to usage by a large number of people on a network during major events and disasters.

During disasters and other major events, people near the event attempt to use communication devices such as mobile telephones to communicate both with emergency services and other people with which they have a relationship. Any emergency personnel in the area are also using communication devices to communicate with emergency services and other emergency personnel.

With significant numbers of people attempting to use a network, for example a cell phone network, to make calls, send pictures/videos or access the Internet, the bandwidth of the network may not be capable of handling the load and the network may collapse. In order to reduce this problem, a provider may severely limit the bandwidth of their cell phone network during most disasters and other major events to specific personnel within the emergency services or other services based on their occupation and importance relative to resolving the event. All other individuals in or near the disaster or major event are prevented from accessing the cell phone network or bandwidth associated with the cell phone network.

SUMMARY

According to one embodiment of the present invention a method for managing an overload of signals on a network due to usage by a large number of users on the network during an event. The method comprising the steps of: a computer detecting the event; the computer detecting a cluster of a volume of communication on the network; the computer determining a physical location of a centroid of the cluster of the volume of the communication on the network, the physical location of the centroid being taken to be the approximate physical location of the detected event; the computer reviewing information within volume of communication being sent through the network regarding the detected event; the computer categorizing the detected event based on a predetermined set of rules; the computer determining bandwidth limitations of the network for users within a determined proximity to the approximate physical location of the detected event; the computer determining the resources necessary to respond to and resolve the detected event; and the computer allocating bandwidth of the network based upon the resources and the proximity of users to the physical location of the detected event.

According to another embodiment of the present invention, a computer program product for managing an overload of signals on a network due to usage by a large number of users on the network during an event. The computer program product comprising: one or more computer-readable, tangible storage devices; program instructions, stored on at least one of the one or more storage devices, to detect the event; program instructions, stored on at least one of the one or more storage devices, to detect a cluster of a volume of communication on the network; program instructions, stored on at least one of the one or more storage devices, to determine a physical location of a centroid of the cluster of the volume of the communication on the network, the physical location of the centroid being taken to be the approximate physical location of the detected event; program instructions, stored on at least one of the one or more storage devices, to review information within volume of communication being sent through the network regarding the detected event; program instructions, stored on at least one of the one or more storage devices, to categorize the detected event based on a predetermined set of rules; program instructions, stored on at least one of the one or more storage devices, to determine bandwidth limitations of the network for users within a determined proximity to the approximate physical location of the detected event; program instructions, stored on at least one of the one or more storage devices, to determine the resources necessary to respond to and resolve the detected event; and program instructions, stored on at least one of the one or more storage devices, to allocate bandwidth of the network based upon the resources and the proximity of users to the physical location of the detected event.

According to another embodiment of the present invention, a system for managing an overload of signals on a network due to usage by a large number of users on the network during an event. The system comprising: one or more processors, one or more computer-readable memories and one or more computer-readable, tangible storage devices; program instructions, stored on at least one of the one or more storage devices for execution by at least one of the one or more processors via at least one of the one or more memories, to detect the event; program instructions, stored on at least one of the one or more storage devices for execution by at least one of the one or more processors via at least one of the one or more memories, to detect a cluster of a volume of communication on the network; program instructions, stored on at least one of the one or more storage devices for execution by at least one of the one or more processors via at least one of the one or more memories, to determine a physical location of a centroid of the cluster of the volume of the communication on the network, the physical location of the centroid being taken to be the approximate physical location of the detected event; program instructions, stored on at least one of the one or more storage devices for execution by at least one of the one or more processors via at least one of the one or more memories, to review information within volume of communication being sent through the network regarding the detected event; program instructions, stored on at least one of the one or more storage devices for execution by at least one of the one or more processors via at least one of the one or more memories, to categorize the detected event based on a predetermined set of rules; program instructions, stored on at least one of the one or more storage devices for execution by at least one of the one or more processors via at least one of the one or more memories, to determine bandwidth limitations of the network for users within a determined proximity to the approximate physical location of the detected event; program instructions, stored on at least one of the one or more storage devices for execution by at least one of the one or more processors via at least one of the one or more memories, to determine the resources necessary to respond to and resolve the detected event; and program instructions, stored on at least one of the one or more storage devices for execution by at least one of the one or more processors via at least one of the one or more memories, to allocate bandwidth of the network based upon the resources and the proximity of users to the physical location of the detected event.

DETAILED DESCRIPTION

The illustrative embodiments provide a computer implemented method, apparatus, and computer usable program code or management of signals, especially an overload of bandwidth usage on a network, and more specifically to managing an overload of signals on a communications network due to usage by a large number of people on a network during major events and disasters. The overload of signals on the network is managed by the party responsible for providing and managing the network, for example a mobile phone provider or other carrier. The network may be the over-the-air carrier-to-mobile telephone network, or the network linking the carrier's towers to central servers and the landline telephone network, or it may be a computer-to-computer data network involving mobile or fixed computers, equipment and terminals.

In the illustrative embodiments below, the term "event" is referred to as a natural, man-made, or technologically induced hazard resulting in an event of substantial extent causing physical damage or destruction, loss of life, or drastic change to the environment. The term "event" and "disaster" are used synonymously.

Figure 1:
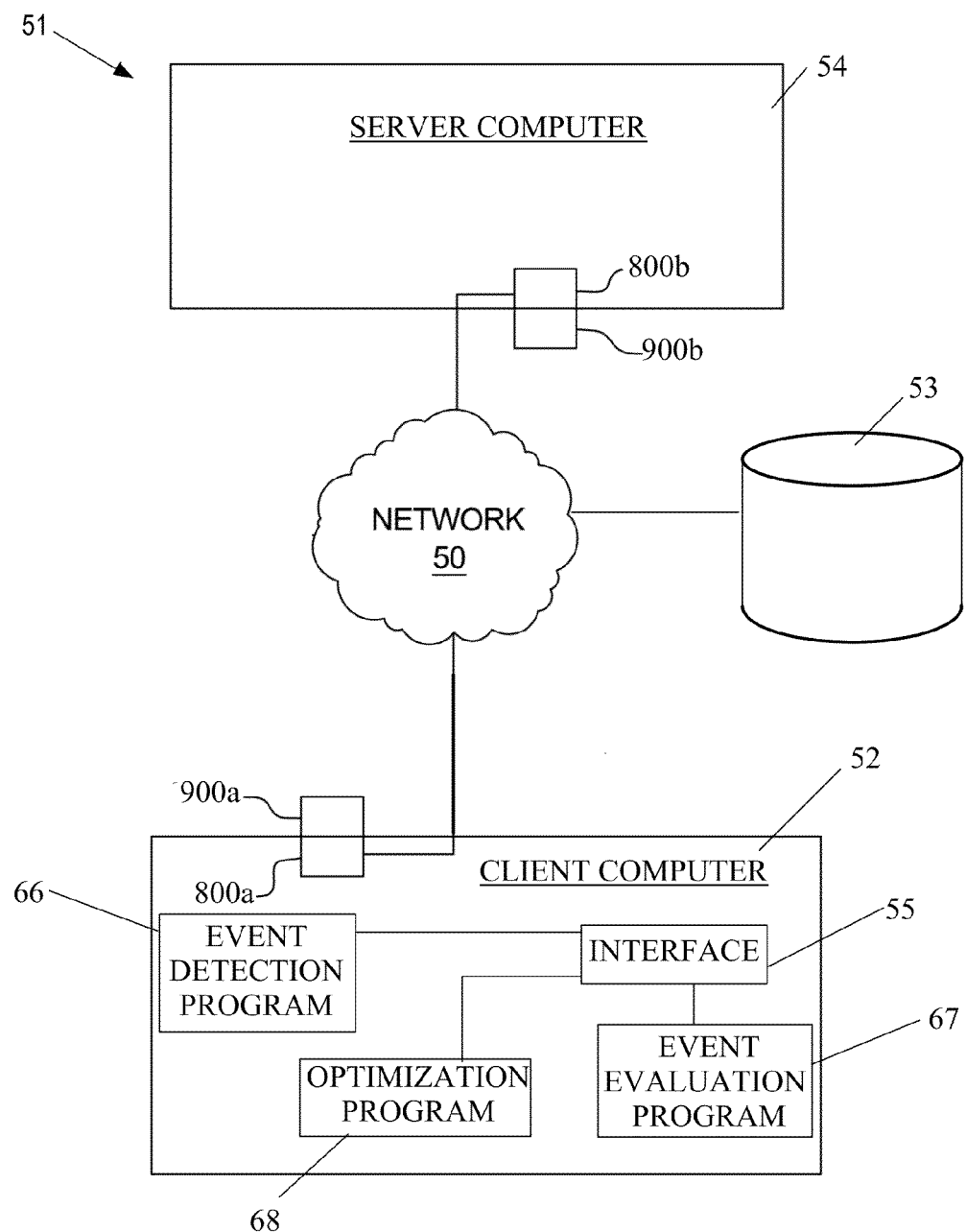
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables. Network 50 may for example be a communications network, such as a cell phone network managed by a network carrier.

In the depicted example, a client computer 52, server computer 54, and a repository 53 connect to network 50. In other exemplary embodiments, network data processing system 51 may include additional client computers, storage devices, server computers, and other devices not shown. The client computer 52 includes a set of internal components 800a and a set of external components 900a, further illustrated in FIG. 4. The client computer 52 may be, for example, a mobile device, a cell phone, a personal digital assistant, a netbook, a laptop computer, a tablet computer, a desktop computer, or any other type of computing device.

Client computer 52 may contain an interface 55. The interface can be, for example, a command line interface, a graphical user interface (GUI), or a web user interface (WUI). The interface 55 may be used, for example for locating clusters of communication, event location, centroids of the clusters of communication, or displaying bandwidth usage. The interface 55 may also accept an input regarding distributing or optimizing the bandwidth usage users within a specific distance of an event.

In the depicted example, server computer 54 provides information, such as boot files, operating system images, and applications to client computer 52. Server computer 54 can compute the information locally or extract the information from other computers on network 50. Server computer 54 includes a set of internal components 800b and a set of external components 900b illustrated in FIG. 4.

Figure 4:
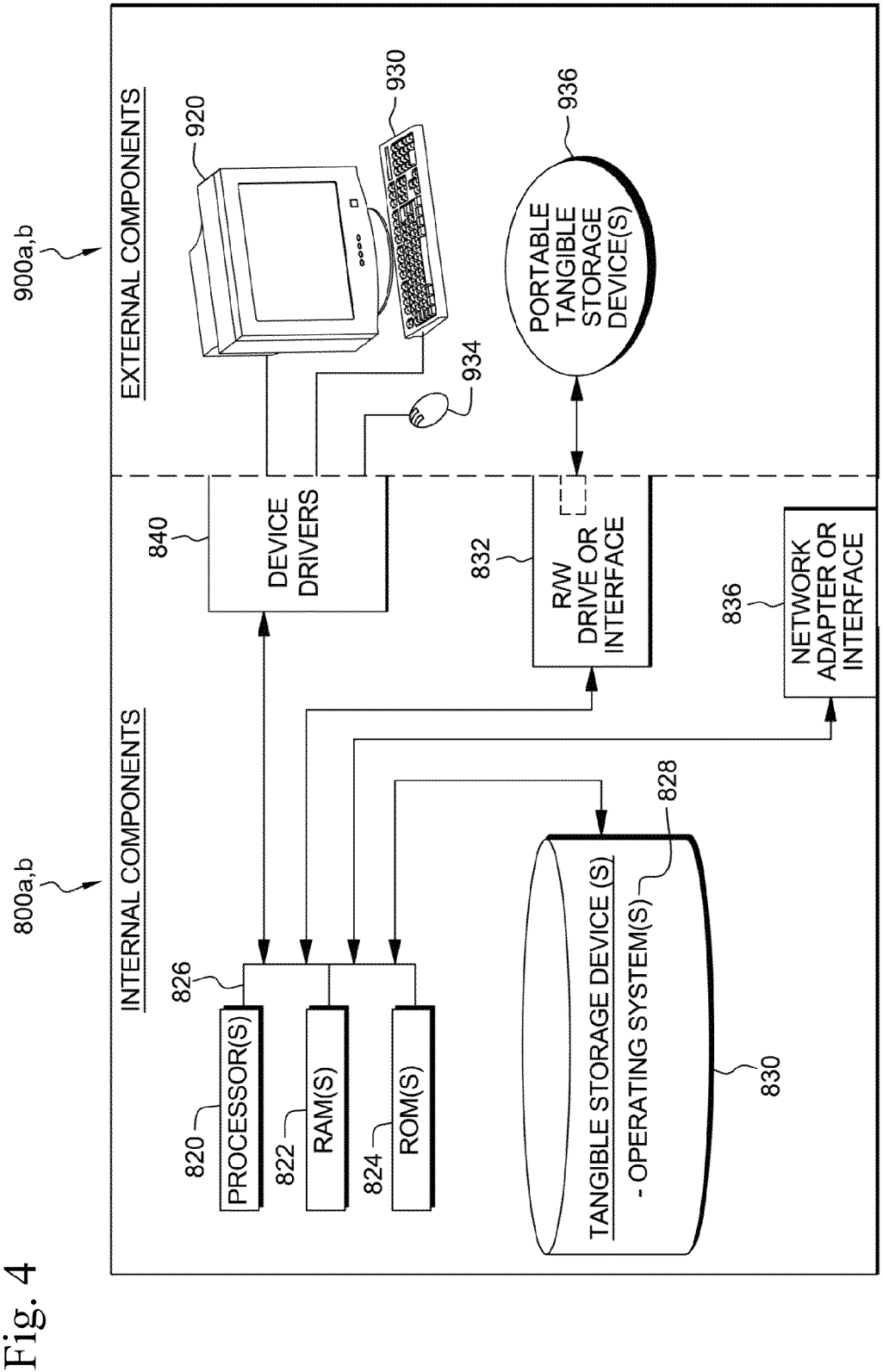
FIG. 4 shows illustrates internal and external components of a client computer and a server computer in which illustrative embodiments may be implemented.

Program code and programs such as an event detection program 66, an event evaluation program 67, and an optimization program 68 may be stored on at least one of one or more computer-readable tangible storage devices 830 shown in FIG. 4, on at least one of one or more portable computer-readable tangible storage devices 936 as shown in FIG. 4, or repository 53 connected to network 50, or downloaded to a data processing system or other device for use. For example, program code, an event detection program 66, an event evaluation program 67, and an optimization program 68 may be stored on at least one of one or more tangible storage devices 830 on server computer 54 and downloaded to client computer 52 over network 50 for use on client computer 52. Alternatively, server computer 54 can be a web server, and the program code, an event detection program 66, an event evaluation program 67, and an optimization program 68 may be stored on at least one of the one or more tangible storage devices 830 on server computer 54 and accessed on client computer 52. Event detection program 66, event evaluation program 67, and optimization program 68 can be accessed on client computer 52 through interface 55. In other exemplary embodiments, the program code and programs such as an event detection program 66, an event evaluation program 67, and an optimization program 68 may be stored on at least one of one or more computer-readable tangible storage devices 830 on client computer 52 or distributed between two or more servers.

During a disaster or major event, the amount of communications around and in a center of the disaster or event increases greatly over normal system load, which places stress on a network 50, causing it to react slowly or drop communications with devices, and in extreme cases can cause the collapse of the network 50.

Figure 2:
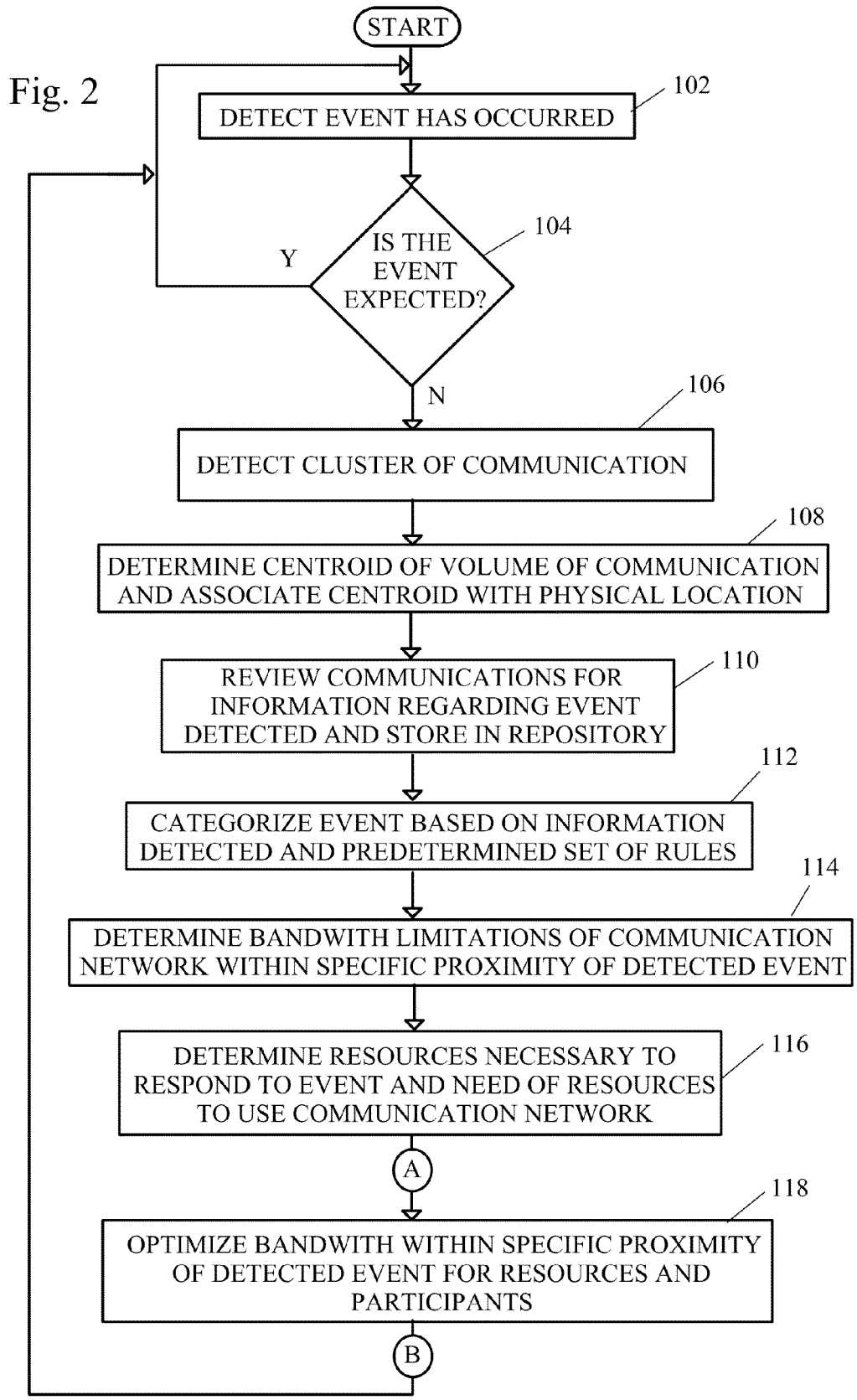
FIGS. 2-3 show a flowchart of a method for managing an overload of signals on a communications network due to usage by a large number of people on a network during major events and disasters.
Figure 3:
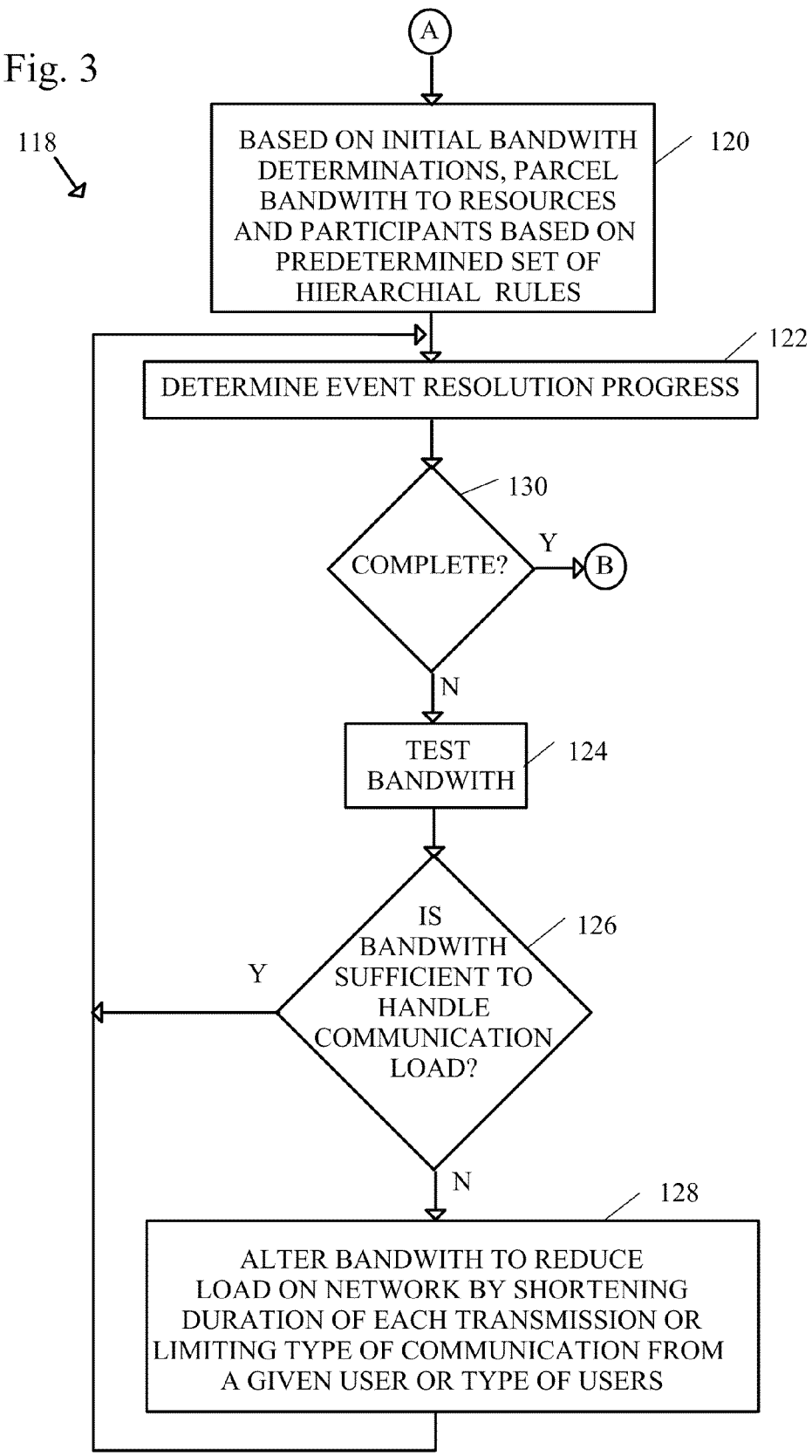

FIGS. 2-3 show a flowchart of a method for managing an overload of signals on a communications network due to usage by a large number of people on a network during major events and disasters.

In a first step, an event is detected as having occurred (step 102), for example by the event detection program 66. If the event is expected (step 104), return to step 102 of detecting an event.

The event may be detected by a process which includes monitoring the amount of network traffic or usage of the bandwidth of the network 50. If there is an amount of network traffic that exceeds a predetermined amount. Alternatively, if the network has a sudden spike in the amount of network traffic, the detection of the event may include determining whether the amount of network traffic of the network 50 is expected by searching for circumstances that would have significant numbers of users together in one place, for example a concert, festival, or sporting event, etc. The level of traffic which is determined to indicate an "event" is herein referred to as a "significant volume of network traffic."

For example, if a major sporting event is taking place, there may be an increase in network traffic on the network 50, but the increase in network traffic would be expected. Furthermore the pattern of network traffic may also be examined, such that if there is a significant volume of network traffic or spike in network traffic that occurs for a small amount of time, followed by a major reduction or complete cessation of network traffic, there may be an event that took place that may require emergency services.

If the event is not expected (as determined in step 104), then (step 106) the method detects a cluster of a significant volume of network traffic, for example by the event detection program 66. The method then determines a physical location of a centroid of the cluster and associates the centroid with a physical location (step 108), for example by the event detection program 66. The centroid is taken to be the approximate physical location of the detected event. A centroid is the center of a mass or cluster of data, which in this case would be taken to be the center location of the "event"—that is, the source of the significant volume of network traffic which is, or might be, creating an overload of system bandwidth.

The communications being sent through the network is reviewed for information regarding the detected event, and the information is stored in a repository (step 110), for example repository 53 of FIG. 1, for example by the event evaluation program 67. The information being reviewed by the network carrier may, for example, be derived from the contents of an emergency call made to emergency services by a user at or near the detected event. Users may also grant permission at a previous time for their communications to be monitored during a detected event. The permission might be granted to the carrier, or to a third party other than the network carrier. Communications sent by the user which are being reviewed may include, but are not limited to, text messages, videos or still pictures, or emergency phone calls.

The information derived from the communications being sent on the network can provide valuable information regarding the detected event, for example the nature of the event, the extent of the event, or the number of injured people. The information from image-type communications being sent on the network, for example videos or pictures, can also provide the information as to the location of the event based on landmarks and infrastructure shown in the images. Furthermore, information from other sources around the determined location of the event, for example from traffic cameras or security cameras, may also be used in conjunction to the communications for information regarding the event.

Based on the information derived from the communications being sent on the network, the detected event is categorized based on a predetermined set of rules (step 112), for example by the event evaluation program 67. The predetermined set of rules may categorize the detected event by the type of event, cause of the event, severity of the event, etc. The type of the event may vary, and can be anything from a car accident to an earthquake, riot or attack. The cause of the event may for example be man-made, natural, or technological. The severity of the event may be, for example, based on the type or amount of infrastructure damaged or impacted, or the amount of people injured or who could potentially be injured.

The bandwidth limitations of the communications network 50 are determined within a specific proximity of the detected event (step 114). The resources necessary to respond to the detected event are determined based on the categorization of the detected event and how much of the bandwidth of the communications network is needed by the resources necessary to respond to the detected event (step 116). Steps 114 and 116 may be carried out, for example by the event evaluation program 67.

The bandwidth of the communication network is optimized within a specific proximity of the detected event for resources and users (step 118), for example by the optimization program 68. After step 118, the method returns to step 102 of detecting an event.

FIG. 3 provides further details within step 118.

Referring to FIG. 3, bandwidth is parceled to resources and participants based on the predetermined set of hierarchical rules (step 120), for example by the optimization program 68. The hierarchical rules are organized with a top level of outgoing/incoming emergency calls, messages, and pictures/videos from emergency services providers receiving the most amount of bandwidth available, being assigned a top priority or ranking.

"Emergency services" are organizations which ensure public safety and health by addressing different emergencies. Emergency services may include, but is not limited to, police, firefighters, emergency medical services, 911 centralized emergency call centers, military services such as Army, Navy, Air Force or Marines, or other law enforcement or rescue organizations such as FEMA or the Coast Guard, or voluntary and community emergency organizations such as the Red Cross, Civil Air Patrol, community ambulance services, etc.

The remaining bandwidth is then divided among other users, with a significant amount of the available bandwidth being given to a second level of other government personnel which are not part of emergency services. For example, such as civilian traffic officers, public utilities, and disaster relief. The second level is given a lower rank than the emergency services.

The remainder or least amount of the bandwidth is provided to the third level of users for calls, messages, pictures or videos, allocated by proximity to the detected event. So, for example, the closer in proximity they are to the centroid of the detected event, the larger the amount of the remaining bandwidth which is allocated to users who are not in the first or second level to make calls, send messages, or pictures/videos. As the user moves further away from the centroid of the detected event, for example if they are evacuated from the detected event, less bandwidth is allotted to them for use.

Priority can be allocated based on the nature of either end of a communication. For example, a call from a civilian user who would normally be in the third level to a 911 call center can be allocated to the first level based on the nature of the recipient of the call. These communications would be given a higher rank than other calls, messages, photos/videos made by the civilian users.

It should be noted that within the first level of emergency services, the calls, messages and photos/videos may be further allocated to give precedence of bandwidth for receiving or sending a short broadcast message warning users within a given proximity of the event. For example, highest priority may be given to a text message sent through a short message service (SMS) from a 911 call center (known as a "reverse message") warning users in the area to evacuate in the expectation of an impending event such as an incoming tsunami or storm surge or approaching danger from a spreading wildfire or hurricane, or warning the users to remain in their houses because of civil unrest or tornado.

The progress of the resolution of the detected event is determined (step 122), for example by the optimization program 68. If the event resolution is complete (step 130), return to step 102 of detecting an event has occurred.

If the event resolution is not complete (step 130), the bandwidth of the network is tested to determine the bandwidth limitations (step 124), for example by the optimization program 68. If the bandwidth is still sufficient to handle the load of communication based on the division of the bandwidth via the hierarchical rules in step 120, return to step 122 of determining the progress of the event resolution.

If the bandwidth is not sufficient to handle the communication load based on the division of the bandwidth via the hierarchical rules made in step 120 (step 126), the load can be further reduced (step 128) by shortening the duration of each transmission or limiting the type of communication from a given user or type of users. For example, civilian or lowest level users might be restricted for a specific period of time to short transmission "burst usage", as in SMS text messaging, while other users of the bandwidth in the first level might be permitted to use voice or image communications.

The method then returns to step 122 of determining the progress of the resolution of the detected event.

FIG. 4 illustrates internal and external components of client computer 52 and server computer 54 in which illustrative embodiments may be implemented. In FIG. 4, client computer 52 and server computer 54 include respective sets of internal components 800a, 800b, and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, an event detection program 66, an event evaluation program 67, and an optimization program 68 are stored on one or more of the computer-readable tangible storage devices 830 for execution by one or more of the processors 820 via one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. An event detection program 66, an event evaluation program 67, and an optimization program 68 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. An event detection program 66, an event evaluation program 67, and an optimization program 68 can be downloaded to client computer 52 and server computer 54 from an external computer via a network (for example, the Internet, a local area network or other, wide area network) and network adapter or interface 836. From the network adapter or interface 836, an optimal lane program 67, and a local environment data program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

An event detection program 66, an event evaluation program 67, and an optimization program 68 can be written in various programming languages including low-level, high-level, object-oriented or non object-oriented languages. Alternatively, the functions of an event detection program 66, an event evaluation program 67, and an optimization program 68 can be implemented in whole or in part by computer circuits and other hardware (not shown).

Based on the foregoing, a computer system, method and program product have been disclosed for managing an overload of signals on a network due to usage by a large number of users on the network during an event. However, numerous modifications and substitutions can be made without deviating from the scope of the present invention. Therefore, the present invention has been disclosed by way of example and not limitation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing an overload of signals on a network due to usage by a large number of users on the network during a natural, man-made, or technologically induced event, the method comprising the steps of:
    a computer detecting the event;
    the computer detecting a cluster of a volume of communication on the network;
    the computer determining a physical location of a centroid of the cluster of the volume of the communication on the network, the physical location of the centroid being taken to be the approximate physical location of the detected event;
    the computer reviewing information within volume of communication between users being sent through the network regarding the detected event to derive information associated with a severity of the detected event;
    the computer categorizing the detected event based on the information reviewed within the volume of communication between users and a predetermined set of rules;
    the computer determining bandwidth limitations of the network for users within a determined proximity to the approximate physical location of the detected event;
    the computer determining bandwidth needed by resources necessary to respond to and resolve the detected event; and
    the computer allocating bandwidth of the network based upon the bandwidth needed by the resources and the proximity of users to the physical location of the detected event.

2. The method of claim 1, wherein the step of the computer allocating the bandwidth of the network for the bandwidth needed by the resources and for users in proximity of the detected event further comprises the steps of: the computer, based on the determined bandwidth limitations of the network, allocating bandwidth among a plurality of levels of users based on a predetermined set of hierarchical rules.

3. The method of claim 2, further comprising the steps of: the computer determining progress towards resolving the detected event; and if the detected event has been resolved, the computer stopping the allocation of bandwidth among a plurality of levels of users based on a predetermined set of hierarchical rule.

4. The method of claim 2, wherein the plurality of levels set by the predetermined set of hierarchical rules comprises:
    a first level comprising emergency services personnel;
    a second level, below the first level comprising government personnel;
    a third level, below the second level comprising other users within a specific proximity of the detected event; and
    wherein the first level is allocated the most bandwidth usage and the third level is allocated the least amount of bandwidth.

5. The method of claim 4, wherein the allocation of the bandwidth to a user in the third level decreases as the user moves further away from the physical location of the detected event.

6. The method of claim 4, wherein within the third level, bandwidth is prioritized for users in communication with emergency services.

7. A computer program product for managing an overload of signals on a network due to usage by a large number of users on the network during a natural, man-made, or technologically induced event, the computer program product comprising:

one or more computer-readable, tangible storage devices;

program instructions, stored on at least one of the one or more storage devices, to detect the event;

program instructions, stored on at least one of the one or more storage devices, to detect a cluster of a volume of communication on the network;

program instructions, stored on at least one of the one or more storage devices, to determine a physical location of a centroid of the cluster of the volume of the communication on the network, the physical location of the centroid being taken to be the approximate physical location of the detected event;

program instructions, stored on at least one of the one or more storage devices, to review information within volume of communication between users being sent through the network regarding the detected event to derive information associated with a severity of the detected event;

program instructions, stored on at least one of the one or more storage devices, to categorize the detected event based on information reviewed within the volume of communication between users and a predetermined set of rules;

program instructions, stored on at least one of the one or more storage devices, to determine bandwidth limitations of the network for users within a determined proximity to the approximate physical location of the detected event;

program instructions, stored on at least one of the one or more storage devices, to determine bandwidth needed by resources necessary to respond to and resolve the detected event; and program instructions, stored on at least one of the one or more storage devices, to allocate bandwidth of the network based upon the bandwidth needed by the resources and the proximity of users to the physical location of the detected event.

8. The computer program product of claim 7, wherein the program instructions, stored on at least one of the one or more storage devices, to allocate the bandwidth of the network for the bandwidth needed by the resources and for users in proximity of the detected event further comprises: program instructions, stored on at least one of the one or more storage devices, based on the determined bandwidth limitations of the network, to allocate bandwidth among a plurality of levels of users based on a predetermined set of hierarchical rules.

9. The computer program product of claim 8, further comprising: program instructions, stored on at least one of the one or more storage devices, to determine progress towards resolving the detected event; and if the detected event has been resolved, stop allocating bandwidth among a plurality of levels of users based on a predetermined set of hierarchical rule.

10. The computer program product of claim 8, wherein the plurality of levels set by the predetermined set of hierarchical rules comprises:
a first level comprising emergency services personnel;
a second level, below the first level comprising government personnel;
a third level, below the second level comprising other users within a specific proximity of the detected event; and
wherein the first level is allocated the most bandwidth usage and the third level is allocated the least amount of bandwidth.

11. The computer program product of claim 10, wherein the allocation of the bandwidth to a user in the third level decreases as the user moves further away from the physical location of the detected event.

12. The computer program product of claim 10, wherein within the third level, bandwidth is prioritized for users in communication with emergency services.

13. A system for managing an overload of signals on a network due to usage by a large number of users on the network during a natural, man-made, or technologically induced event, the system comprising:
one or more processors, one or more computer-readable memories and one or more computer-readable, tangible storage devices;

program instructions, stored on at least one of the one or more storage devices for execution by at least one of the one or more processors via at least one of the one or more memories, to detect the event;

program instructions, stored on at least one of the one or more storage devices for execution by at least one of the one or more processors via at least one of the one or more memories, to detect a cluster of a volume of communication on the network;

program instructions, stored on at least one of the one or more storage devices for execution by at least one of the one or more processors via at least one of the one or more memories, to determine a physical location of a centroid of the cluster of the volume of the communication on the network, the physical location of the centroid being taken to be the approximate physical location of the detected event;

program instructions, stored on at least one of the one or more storage devices for execution by at least one of the one or more processors via at least one of the one or more memories, to review information within volume of communication between users being sent through the network regarding the detected event to derive information associated with a severity of the detected event;

program instructions, stored on at least one of the one or more storage devices for execution by at least one of the one or more processors via at least one of the one or more memories, to categorize the detected event based on information reviewed within the volume of communication between users and a predetermined set of rules;

program instructions, stored on at least one of the one or more storage devices for execution by at least one of the one or more processors via at least one of the one or more memories, to determine bandwidth limitations of the network for users within a determined proximity to the approximate physical location of the detected event;

program instructions, stored on at least one of the one or more storage devices for execution by at least one of the one or more processors via at least one of the one or more memories, to determine bandwidth needed by resources necessary to respond to and resolve the detected event; and program instructions, stored on at least one of the one or more storage devices for execution by at least one of the one or more processors via at least one of the one or more memories, to allocate bandwidth of the network based upon the bandwidth needed by the resources and the proximity of users to the physical location of the detected event.

14. The system of claim 13, wherein the program instructions, stored on at least one of the one or more storage devices for execution by at least one of the one or more processors via at least one of the one or more memories, to allocate the bandwidth of the network for the bandwidth needed by the resources and for users in proximity of the detected event further comprises: program instructions, stored on at least one of the one or more storage devices for execution by at least one of the one or more processors via at least one of the one or more memories, to allocate bandwidth among a plurality of levels of users based on a predetermined set of hierarchical rules.

15. The system of claim 14, further comprising: program instructions, stored on at least one of the one or more storage devices for execution by at least one of the one or more processors via at least one of the one or more memories, to determine progress towards resolving the detected event; and if the detected event has been resolved, stop allocating bandwidth among a plurality of levels of users based on a predetermined set of hierarchical rule.

16. The system of claim 14, wherein the plurality of levels set by the predetermined set of hierarchical rules comprises:
a first level comprising emergency services personnel;
a second level, below the first level comprising government personnel;
a third level, below the second level comprising other users within a specific proximity of the detected event; and
wherein the first level is allocated the most bandwidth usage and the third level is allocated the least amount of bandwidth.

17. The system of claim 16, wherein the allocation of the bandwidth to a user in the third level decreases as the user moves further away from the physical location of the detected event.

18. The system of claim 16, wherein within the third level, bandwidth is prioritized for users in communication with emergency services.

19. The method of claim 1, wherein the information reviewed within the volume of communication between users is based on communications containing images.

20. The method of claim 1, further comprising the step of receiving additional information from non-user associated cameras located around the physical location of the event, and the step of reviewing the information further includes reviewing the additional information along with the volume of communications from users to derive information associated with a severity of the detected event.

21. The computer program product of claim 7, wherein the information reviewed within the volume of communication between users is based on communications containing images.

22. The computer program product of claim 7, further comprising program instructions to receive additional information from non-user associated cameras located around the physical location of the event, and the program instructions to review the information further includes program instructions to review the additional information along with the volume of communications from users to derive information associated with a severity of the detected event.

23. The computer system of claim 13, wherein the information reviewed within the volume of communication between users is based on communications containing images.

24. The computer system of claim 13, further comprising program instructions stored on at least one of the one or more storage devices for execution by at least one of the one or more processors via at least one of the one or more memories, to receive additional information from non-user associated cameras located around the physical location of the event, and the program instructions stored on at least one of the one or more storage devices for execution by at least one of the one or more processors via at least one of the one or more memories, to review the information further includes program instructions to review the additional information along with the volume of communications from users to derive information associated with a severity of the detected event.

* * * * *